United States Patent [19]

Mansfield, Jr.

[11] Patent Number: 5,972,122

[45] Date of Patent: Oct. 26, 1999

[54] METHOD OF DEGREASING ANODE CUPS

[75] Inventor: Robert N. Mansfield, Jr., Valley View, Ohio

[73] Assignee: Eveready Battery Company, Inc., St. Louis, Mo.

[21] Appl. No.: 08/873,282

[22] Filed: Jun. 11, 1997

[51] Int. Cl.$^6$ ................................ B08B 3/04; B08B 3/12; C23G 5/06

[52] U.S. Cl. .................. 134/1; 134/26; 134/29; 134/40; 134/22.14; 134/22.19

[58] Field of Search .................................. 134/1, 26, 29, 134/40, 22.14, 22.19; 429/164, 176

[56] References Cited

U.S. PATENT DOCUMENTS

| | | | |
|---|---|---|---|
| 3,842,487 | 10/1974 | Hartz | 29/503 |
| 5,279,905 | 1/1994 | Mansfield, Jr. et al. | 429/27 |
| 5,464,477 | 11/1995 | Awad | 134/1 |

FOREIGN PATENT DOCUMENTS

| | | |
|---|---|---|
| 63-021747 | 1/1988 | Japan . |
| 05195007 | 8/1993 | Japan . |
| 09111485 | 4/1997 | Japan . |
| 2254806 | 4/1991 | United Kingdom . |

OTHER PUBLICATIONS

*Metals Handbook*, Ninth Edition, vol. 5—Surface Cleaning, Finishing and Coating, American Society for Metals, Metals Park, OH, 1985, pp. 3–21.

*Primary Examiner*—Zeinab El-Arini
*Attorney, Agent, or Firm*—Robert W. Welsh; Russell H. Toye, Jr.

[57] ABSTRACT

A method of degreasing an anode cup used in a zero-mercury, zinc air electrochemical cell involves contacting the anode cup with an aqueous detersive system containing one or more surfactants and which is subjected to an ultrasonic field. After being immersed in the detersive system for a suitable period of time, the anode cups are rinsed, preferably in an ultrasonic field, and dried. The resulting anode cups have lower levels of impurities, and lower levels of oxygen atoms on the surface, which provide a more hydrophobic surface containing lower levels of water and hydroxyl groups. Zinc air cells prepared from the anode cups degreased in accordance with the method of this invention exhibit less hydrogen gassing and improved performance characteristics.

22 Claims, No Drawings

METHOD OF DEGREASING ANODE CUPS

FIELD OF THE INVENTION

This invention relates to a method of degreasing anode cups used in electrochemical cells.

BACKGROUND OF THE INVENTION

A problem associated with zero-mercury, zinc air batteries is that contamination of the components thereof can cause formation of hydrogen gas within the cell, which can, in turn, result in inferior cell performance. In particular, lubricants, adhesives, and other materials used during manufacturing of the anode cups can contaminate the surfaces thereof and cause excessive hydrogen formation in an assembled zero-mercury, zinc air cell. Hydrogen gassing within the cell adversely affects shelf life, open circuit voltage, and service maintenance of the cell. Accordingly, cleaning or decontamination of the anode cup is regarded as an essential step in the production of zero-mercury, zinc air cells. The accepted method of cleaning the anode cups for zero-mercury, zinc air cell is to use an organic degreasing solvent such as trichloroethylene. Organic degreasing solvents are generally volatile and environmentally unfriendly. Further, the organic degreasing solvents do not eliminate hydrogen gassing. In fact, in many cases, the solvent cleaned anode cups exhibit undesirably high levels of hydrogen gassing which result in inferior cell performance and a relatively short shelf life. In an attempt to further reduce the level of contamination on anode cup surfaces, solvent cleaning has been supplemented with plasma cleaning. However, plasma cleaning has not always reduced hydrogen gassing or provided improved cell performance. In fact, plasma cleaning has been found to often increase long term hydrogen gassing within the cell.

SUMMARY OF THE INVENTION

This invention provides a method of degreasing an anode cup for an electrochemical cell, which involves the steps of providing an aqueous detersive system, and contacting the anode cup with the aqueous detersive system.

These and other features, advantages and objects of the present invention will be further understood and appreciated by those skilled in the art by reference to the following specification, claims and appended drawings.

DETAILED DESCRIPTION OF PREFERRED EMBODIMENT

This invention involves the discovery of a method of degreasing anode cups for electrochemical cells. It involves, more particularly, contacting the anode cup with an aqueous detersive system containing one or more surfactants and which is subjected to an ultrasonic field. After being immersed in the detersive system for a suitable period of time, the anode cups are rinsed, preferably in an ultrasonic field, and dried. The resulting anode cups have lower levels of impurities, and lower levels of oxygen atoms on the surface, which provide a more hydrophobic surface containing lower levels of water and hydroxyl groups. Zinc air cells prepared from the anode cups degreased in accordance with the method of this invention exhibit less hydrogen gassing and improved performance characteristics.

Suitable detersive systems include aqueous systems comprised primarily of water and containing one or more surfactants. The detersive system may also contain various additives which are commonly employed in detersive systems. Such additives include builders which augment the detersive effects of surfactants. Other suitable additives include organic additives which improve cleaning performance and exhibit other desirable properties. Such additives may serve various functions, such as reducing redeposition of soil from the detergent bath back onto the anode substrate, inhibiting foaming, increasing solubility of the detergent composition, sequestering heavy-metal ions, etc.

Surfactants which may be employed in the detersive system include anionic surfactants, cationic surfactants, non-ionic surfactants, and amphoteric surfactants. Examples of anionic surfactants include carboxylates; acylated protein hydrolysates prepared by acylation of protein hydrolysates with fatty acids or acid chlorides; sulfonates, such as alkylbenzenesulfonates, alkylarenesulfonates; short-chain lignosulfates, naphthalenesulfonates, alpha-olefinsulfonates, petroleum sulfonates; sulfates and sulfated products such as sulfated alcohols and sulfated alcohol ethyoxylates; phosphate esters, such as mono-andiesters of orthophosphoric acid and their salts. Examples of suitable cationic surfactants include amines such as laurylamine 2-alkyl-1-(2-hydroxyethyl)-2-imidazolines, e.g., the salt of a carboxylic acid with (2-hydroxyethyl) ethylenediamine, and quaternary ammonium salts. Examples of amphoteric surfactants include imidazolinium derivatives such as those prepared from 2-alkyl-1-(2-hydroxyethyl)-2-imidazolines and sodium chloracetate. Examples of suitable non-ionic surfactants include ethoxylates which are prepared by base-catalyzed ethoxylation of aliphatic alcohols; alkylphenols; and fatty acids; carboxylic acid esters including glycerol esters, polyoxyethylene esters, anhydrosorbitol esters; ethoxylated anhydrosorbitol esters; natural fats, oils and waxes; and ethoxylated glycol esters of fatty acids; carboxylic amides which are the condensation products of fatty acids and hydroxyalkyl amines, such as diethanolamine condensates, monoalkanolamine condensates, and polyoxyethylene fatty acid amides; and polyalkylene oxide block copolymers.

The preferred detersive systems are those comprising or consisting essentially of one or more non-ionic surfactants dispersed in an aqueous medium. Preferred non-ionic surfactants include carboxylic amides which are the condensation product of a fatty acid and a hydroxyalkyl amine, alkyl phenoxy alkoxy alcohols, and alkylene glycols.

A suitable and currently preferred commercially available product is "CHEM-CREST 103", which is an aqueous detersive system containing nonylphenoxyethoxyethanol, hexylene glycol, coconut diethanol amide and distilled water, and marketed by Crest Ultrasonics Corporation, Trenton, N.J.

The concentration of the surfactants in the aqueous detersive system can vary considerably, with the limits being generally within the range normally employed in industrial applications for cleaning or degreasing solid substrates.

The method generally involves contacting the anode cup with a suitable detersive system, especially immersing the anode cup in the detersive system, with the detersive system being subjected to agitation. The detersive system is preferably subjected to a strong ultrasonic field which causes the detersive system to cavitate. Cavitational implosions at or near the surface of the anode cup facilitate effective degreasing thereof.

The cleaning or degreasing method preferably includes at least one ultrasonic washing step, at least one rinse step, and is concluded with an air drying step. A presently preferred technique is to ultrasonically wash the anode cups in a detersive system for approximately 20 minutes, ultrasonically rinse the anode cups for approximately 9 minutes, spray rinse the anode cups for approximately 1 minute, repeat the ultrasonic rinse and spray rinse steps 3 additional times, and air dry the anode cups for approximately 20 to 30 minutes. Ultrasonic washing refers to immersing the anode cups in an ultrasonic wash bath containing a detersive system as set forth above. Ultrasonic rinsing refers to immersing the anode cups in water subjected to an ultrasonic field. The anode cups are preferably dried at an elevated temperature, such as from about 120° F. to about 200° F., more preferably from about 150° F. to about 180° F., and most preferably from about 150° F. to about 160° F.

The cleaning or degreasing method of this invention has been found to have several major advantages over conventional degreasing methods involving the use of organic degreasing solvents such as trichloroethylene, plasma cleaning, and the combination of solvent cleaning and plasma cleaning. In particular, cells prepared from anode cups which were degreased by ultrasonic cleaning of the anode cups in an aqueous detersive system have exhibited improved shelf life, improved service maintenance, and higher open circuit voltage, as compared with cells which were otherwise identical, but were cleaned using conventional solvent and plasma techniques. The above advantages were achieved without any significant concomitant adverse effects being noted.

Table I summarizes the improvement in cell performance with anode cups degreased using the ultrasonic detergent degreasing method of this invention for degreasing anode cups as compared with convention solvent degreasing. Service maintenance at elevated temperatures were improved by 10% to 15%, as shown in Table I. Shelf life was improved to 17 weeks at 71° C., and the number of cells exhibiting gas bubbles was dramatically reduced.

TABLE I

PERFORMANCE SUMMARY

|  | Ultrasonic Detergent Degreased | Solvent Degreased |
| --- | --- | --- |
| OCV | 1.41 V | 1.41 V |
| CCV | 1.10 V | 1.09 V |
| 40 Hz | 8.6 Ohms | 8.6 Ohms |
| 625 Ohm Service |  |  |
| Fresh | 519 mAh | 509 mAh |
| 3 Months/21° C. | 511 mAh | 496 mAh |
| 20 Days/60° C. | 494 mAh | 441 mAh |
| 40 Days/60° C. | 483 mAh | 403 mAh |
| 60 Days/60° C. | 468 mAh | 384 mAh |
| 80 Days/60° C. | 449 mAh | 364 mAh |
| 625 Ohm Service Main. |  |  |
| 3 Months/21° C. | 98.4% | 97.4% |
| 20 Days/60° C. | 94.5% | 86.6% |
| 40 Days/60° C. | 93.0% | 79.3% |
| 60 Days/60° C. | 90.2% | 75.6% |
| 80 Days/60° C. | 86.2% | 71.6% |
| 71° C. Shelf Life |  |  |
| OCV < 1.36 V | 17 Weeks | 12 Weeks |
| CCV < 0.90 V | 17 Weeks | 8 Weeks |
| Gas Bubbles on Tape | 3.5% | 91% |
| Gas Bubbles on Tab | 3% | 85% |

Table II shows that the amount of hydrogen gas in the cells does not increase with time between 48 hours and 38 days with the ultrasonic detergent degreasing method, whereas the amount of hydrogen gas generated in cells having anode cups degreased using conventional solvent degreasing exhibited a significant increase in hydrogen gas generation between 48 hours and 38 days.

TABLE II

AZ675 Cells
Hydrogen Gas Generation
(cc $H_2$/Cell)

| Anode Cup/Cell Age/ Surface Treatment | Indium Plated Anode Cup |
| --- | --- |
| Crest - 48 Hours | 0.05 |
| Solvent - 48 Hours | 0.04 |
| Crest - 38 Days | 0.04 |
| Solvent - 38 Days | 0.30 |

In particular, it has been found that there is less oxygen on the surface of the anode cups degreased in accordance with the method of this invention as compared with the solvent degreased anode cups. As a result, the anode cups degreased in accordance with the method of this invention are more hydrophobic and tend to attract less water and hydroxyl groups as compared with the solvent degreased anode cup surface. Water and hydroxyl groups on the surface of the anode cup are believed to be the source of the hydrogen gassing reaction. Consequently, the reduced oxygen levels on the surface of the anode cups degreased in accordance with the method of this invention is believed to lead directly to reduced hydrogen gassing in the cell, and consequently improved cell performance.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The embodiments of the invention in which an exclusive property or privilege is claimed are defined as follows:

1. A method of degreasing an anode cup for an electrochemical cell, comprising:
   providing an aqueous detersive system; and
   contacting the anode cup with the aqueous detersive system, whereby degreasing of the anode cup is achieved.

2. The method of claim 1 further comprising subjecting the detersive system and anode cup to an ultrasonic field to cause cavitation of the detersive system.

3. The method of claim 2, wherein the detersive system comprises a plurality of surfactants.

4. The method of claim 3, wherein the surfactants are all non-ionic.

5. The method of claim 4, wherein the non-ionic surfactants are selected from alkyl phenoxy alkoxy alcohols, alkylene glycols, and carboxylic amides which are a condensation product of a fatty acid and a hydroxy alkyl amine.

6. The method of claim 5, wherein the non-ionic surfactants are nonylphenoxyethoxyethanol, coconut diethanol amide, and hexylene glycol.

7. The method of claim 1, wherein the detersive system comprises a plurality of surfactants.

8. The method of claim 7, wherein the surfactants are all non-ionic.

9. The method of claim 8, wherein the non-ionic surfactants are selected from alkyl phenoxy alkoxy alcohols, alkylene glycols, and carboxylic amides which are a condensation product of a fatty acid and a hydroxy alkyl amine.

10. The method of claim 8, wherein the non-ionic surfactants are nonylphenoxyethoxyethanol, coconut diethanol amide, and hexylene glycol.

11. A method of degreasing an anode cup for an electrochemical cell, comprising:
  immersing the anode cup in a detersive system being subjected to an ultrasonic field sufficient to cause cavitational implosions at or near the surface of the anode cup;
  removing the anode cup from the detersive system;
  rinsing the anode cup; and
  drying the anode cup.

12. The method of claim 11, wherein the anode cup subsequently is dried at a temperature of from about 100° F. to about 200° F.

13. The method of claim 11, wherein the anode cup is subsequently dried at a temperature of from about 150° F. to about 160° F.

14. The method of claim 13, wherein the detersive system comprises a plurality of surfactants.

15. The method of claim 14, wherein the surfactants are all non-ionic.

16. The method of claim 15, wherein the non-ionic surfactants are selected from alkyl phenoxy alkoxy alcohols, alkylene glycols, and carboxylic amides which are a condensation product of a fatty acid and a hydroxy alkyl amine.

17. The method of claim 16, wherein the non-ionic surfactants are nonylphenoxyethoxyethanol, coconut diethanol amide, and hexylene glycol.

18. The method of claim 11, wherein rinsing of the anode cup includes immersing the anode cup in water subjected to an ultrasonic field.

19. The method of claim 18, wherein the detersive system comprises a plurality of surfactants.

20. The method of claim 19, wherein the surfactants are all non-ionic.

21. The method of claim 20, wherein the non-ionic surfactants are selected from alkyl phenoxy alkoxy alcohols, alkylene glycols, and carboxylic amides which are a condensation product of a fatty acid and a hydroxy alkyl amine.

22. The method of claim 21, wherein the non-ionic surfactants are nonylphenoxyethoxyethanol, coconut diethanol amide, and hexylene glycol.

* * * * *